Jan. 12, 1937.    K. E. KYLÉN    2,067,714
PISTON PIN
Filed April 25, 1934

INVENTOR
KARL ERIK KYLÉN
BY
ATTORNEY

Patented Jan. 12, 1937

2,067,714

UNITED STATES PATENT OFFICE 2,067,714

PISTON PIN

Karl Erik Kylén, Goteborg, Sweden, assignor to Aktiebolaget Svenska Kullagerfabriken, Goteborg, Sweden, a corporation of Sweden Application April 25, 1934, Serial No. 722,371
In Sweden September 2, 1933

1 Claim. (Cl. 309—19)

The present invention relates to improvements in piston pins adapted to be mounted in roller bearings, and has for an object to make it possible to insert such a piston pin along with a set or sets of rollers assembled on it as a unit in the piston and the connecting rod. Another object of the invention is to form the inner roller race and the guide flanges for the bearing roller from the solid piston pin.

Another object of the invention is to make a compact roller bearing piston pin which can be easily inserted in the piston and connecting rod as a unit together with the sets of rollers. A further object being to form the parts so that the diameter across at least one of the sets of rollers shall be not greater than the diameter of the body of the piston pin.

Another object of the invention being to provide a piston pin having at the respective ends of its body portion an inner race groove formed in the solid pin, the sides of which groove constituting guide flanges for bearing rollers, there being a set of bearing rollers mounted in each of the race grooves between the guide flanges thereof, the bottom of each of the grooves being at a depth below the surface of the body of the pin which is almost as great as the diameter of the rollers therein.

Another object of the invention is to sink the race grooves for the rolling elements into the body of the piston pin without in any way weakening the strength of the piston pin.

Figure 1:
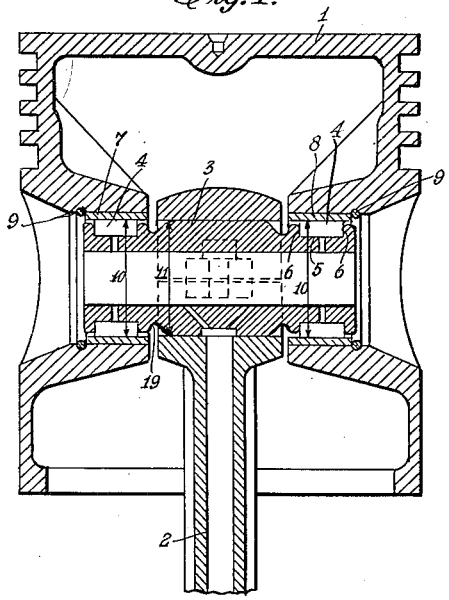

Two embodiments of the invention are shown on the accompanying drawing in which, Figure 1 is a section through a piston and a portion of a connecting rod with the piston pin assembled therein.

Figure 2:
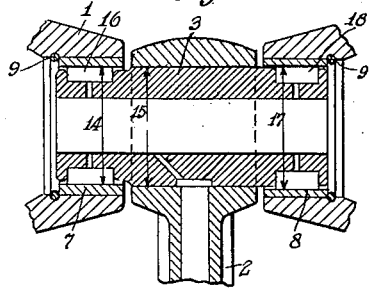
Figure 3:
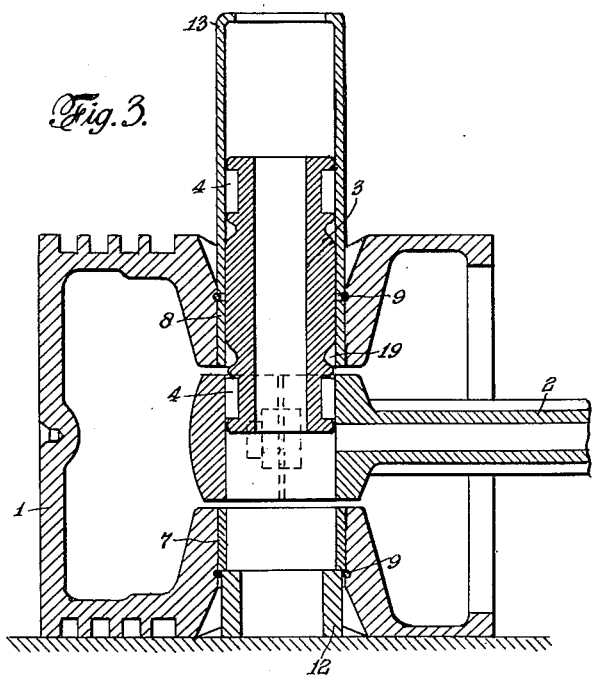

Figure 2 shows a section through a part of a piston with a modified form of a piston pin, and Figure 3 finally shows the manner of inserting the piston pin.

Figure 1 shows the piston 1 and the connecting rod 2 in which a hollow piston pin 3 is mounted. The piston pin is fixed to the connecting rod and mounted in the piston by means of roller bearings formed by sets of rollers 4. The inner races 5 of the roller bearings and the guide flanges 6 are formed from the solid pin.

The present inventor has taken advantage of the fact that the contour of a round bar of uniform strength is of more or less tapering form. From this it is apparent that race grooves at the ends of the pin for the set or rows of rollers may be sunk into the body of the pin to a depth below the surface of the body thereof which is almost as great as the diameter of the rollers therein, without in any way weakening its strength, since the diameter of the middle position must be made to withstand the forces acting on the pin, and the bearing will be sufficiently strong if made of a diameter substantially equal to the diameter of the body of the pin. As shown in the sketch, the roller grooves do not come within the outline denoting the limit for a pin of uniform strength.

The outer races of the bearings are formed by steel sleeves 7 and 8 pressed into the piston. The sleeves are prevented from creeping out of the piston by means of split spring rings 9 located in grooves in the piston. The roller races are so deep that the outer diameters 10 of the sets of rollers are substantially equal to the diameter 11 of the piston pin. This embodiment is most suitable where the connecting rod head is split.

The manner of assembling is shown in Fig. 3. The sleeves 7 and 8 are first brought into position and secured by means of the split spring rings 9. The piston is then turned on its side with the bore for the piston pin in vertical position, and the connecting rod head is held so that its bore is located substantially coaxial to the bore for the piston pin. A stop ring 12 is applied as shown in the figure. The piston pin with the sets of rollers 4 attached is fitted into a sleeve 13 which may for instance be the box in which the pin is delivered. The pin is assembled in the following manner.

The sleeve 13 together with the piston pin therein is turned with its open end downwards over the piston pin hole, and a few light blows generally suffice to cause the piston pin together with the sets of rollers to fall down until they are stopped by the stop ring 12. The piston pin is then in correct position relative to the piston as well as to the connecting rod head and is secured in this position by tightening up the locking screws, shown in dotted lines in Figs. 1 and 3, of the connecting rod head.

As will be seen from the above description the assembly is a very easy matter. The piston pin together with the sets of rollers being taken direct from the package and inserted in its place in the piston, the rollers which in such applications are not provided with cages are prevented from getting disarranged or lost and simultaneously the introduction of dust or other injurious particles into the bearings is prevented.

Fig. 2 shows an embodiment of the invention specially adapted in case the connecting rod head is not split. The diameter 14 of one set of rollers 16 is in this case somewhat smaller than the largest diameter 15 of the piston pin which in its turn is somewhat smaller than the diameter 17 of the other set of rollers 18. The set of rollers 16 may then easily be introduced through the connecting rod head and the piston pin secured thereto. The difference between the largest and smallest diameter is smaller than the roller diameter and consequently the rollers also in this case cannot fall out of their positions.

As shown in Fig. 1 the piston pin may conveniently be provided with a well rounded groove 19 close inside each track. The groove serves the purpose of distributing the deformations, thereby reducing the stresses at the angle between the inner races 5 and the flanges 6. The groove must be well rounded, in order to prevent the concentration of dangerous stresses.

Having thus described my invention, I claim and desire to secure by Letters Patent:

The combination with a piston pin having at the respective ends of the body portion an inner race groove formed in the solid metal of the pin, the sides of which groove constituting guide flanges for bearing rollers, of a set of bearing rollers mounted in each of the race grooves between the guide flanges thereof, the bottom of each of the grooves being at a depth below the surface of the body of the pin which is almost as great as the diameter of the rollers therein.

KARL ERIK KYLÉN.